UNITED STATES PATENT OFFICE.

FERDINAND TIEMANN, OF BERLIN, GERMANY.

IMPROVEMENT IN MANUFACTURE OF VANILLINE.

Specification forming part of Letters Patent No. 192,542, dated June 26, 1877; application filed April 26, 1877.

*To all whom it may concern:*

Be it known that I, FERDINAND TIEMANN, chemist, of the city of Berlin, Empire of Germany, have invented an Improvement in the Production of Vanilline from Oil of Cloves, of which the following is a specification:

Oil of cloves consists of eugenol and an indifferent hydrocarbon. To separate the two constituents one from another, oil of cloves is diluted with three times its volume of ether. The ether solution is agitated with a weak solution of hydrate of sodium or potassium. The latter then takes all the eugenol and leaves the indifferent hydrocarbon in the ether. After having acidulated the alkaline solution of eugenol by means of sulphuric acid or hydrochloric acid, &c., it is agitated once more with ether. This takes all the eugenol, which can be obtained in a pure state by distilling off the ether.

Pure eugenol, one kilogram, is heated for a couple of hours with acetic anhydride, one and one-half kilogram, and thereby changed into aceto-eugenol. The cooled liquid is carefully distributed in about twenty liters of warm water, and a solution of one and one-half kilogram of permanganate of potassium in about two hundred liters of warm water is allowed to flow gradually into it. At the same time the liquid is stirred up constantly. By means of permanganate of potassium the aceto-eugenol is oxidized and the hydrate of the manganese dioxide is separated out. To the liquid filtered from the latter hydrate of sodium is added in a small excess, to give it a weak alkaline reaction, then the liquid is evaporated till to a volume of about twenty-five liters. The liquid concentrated in this way is acidulated with sulphuric or hydrochloric acid and agitated with ether. The ether then takes the vanilline form in the described way, and which is purified by any one of the known methods.

Having described my invention, what I claim, and desire to secure by Letters Patent, is—

The process of producing vanilline from oil of cloves, first, by forming an etheric solution of such oil of cloves, adding thereto hydrate of sodium or potassium, and acidulating with sulphuric or hydrochloric acid, eliminating the ether by distillation; second, heating the eugenol so obtained, with the addition of acetic-anhydride, adding warm water to the cooled liquid, and permanganate of potassium, eliminating therefrom the manganese dioxide; third, adding an excess of hydrate of sodium to the filtered liquid, and evaporating; and, finally, adding sulphuric or hydrochloric acid to the concentrated solution, agitating the same with an addition of ether, and purifying the vanilline so obtained by any of the known methods.

In testimony whereof I have signed my name to this specification in the presence of two subscribing witnesses.

FERDINAND TIEMANN.

Witnesses:
 GEORG PRIMOIR,
 HERMANN KREISMANN.